Feb. 17, 1948.  P. W. MARTIN  2,436,047
TOOL INDICATOR
Filed June 15, 1945  2 Sheets-Sheet 1
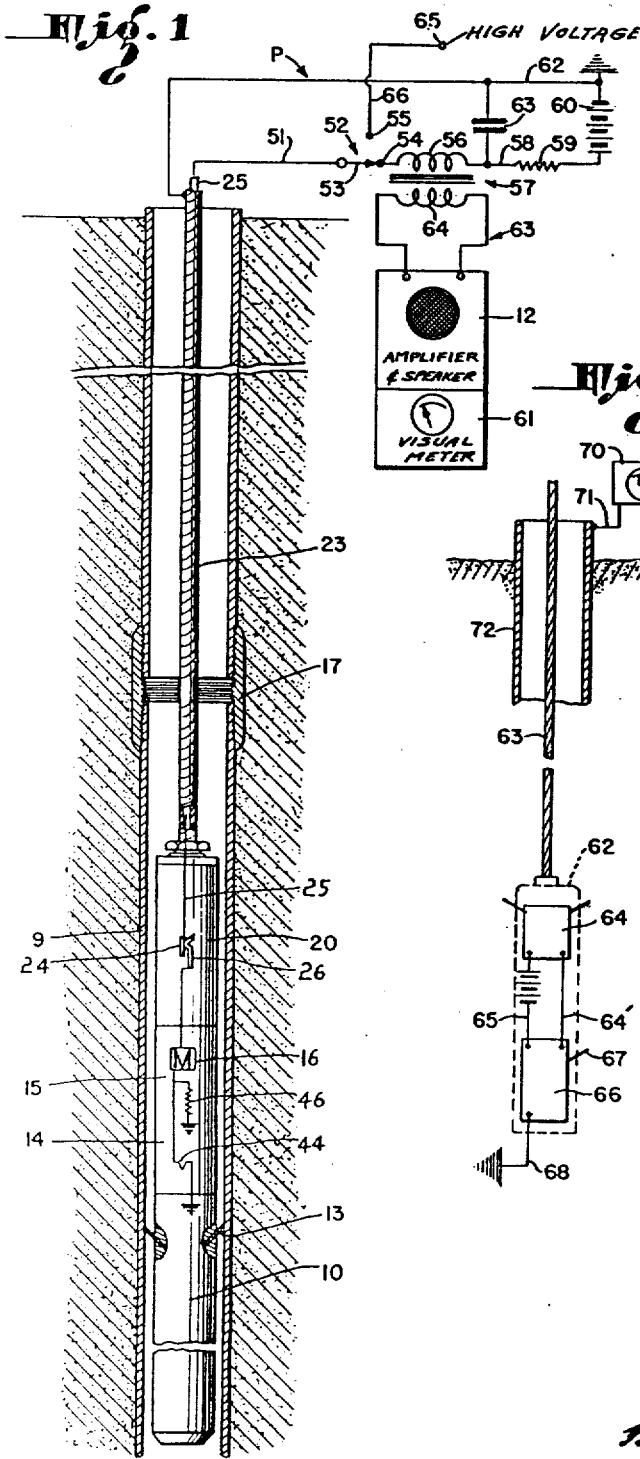
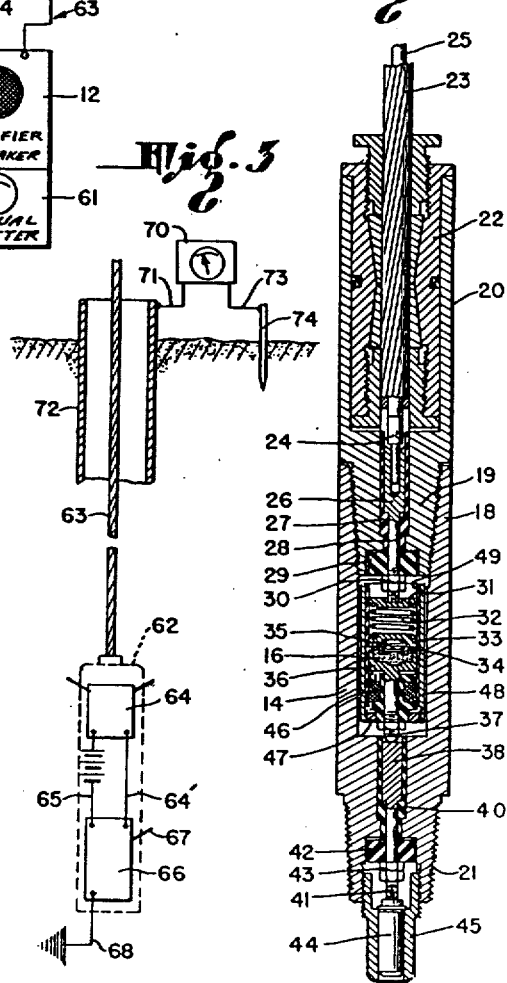
INVENTOR.
PHILIP W. MARTIN
BY
ATTORNEY

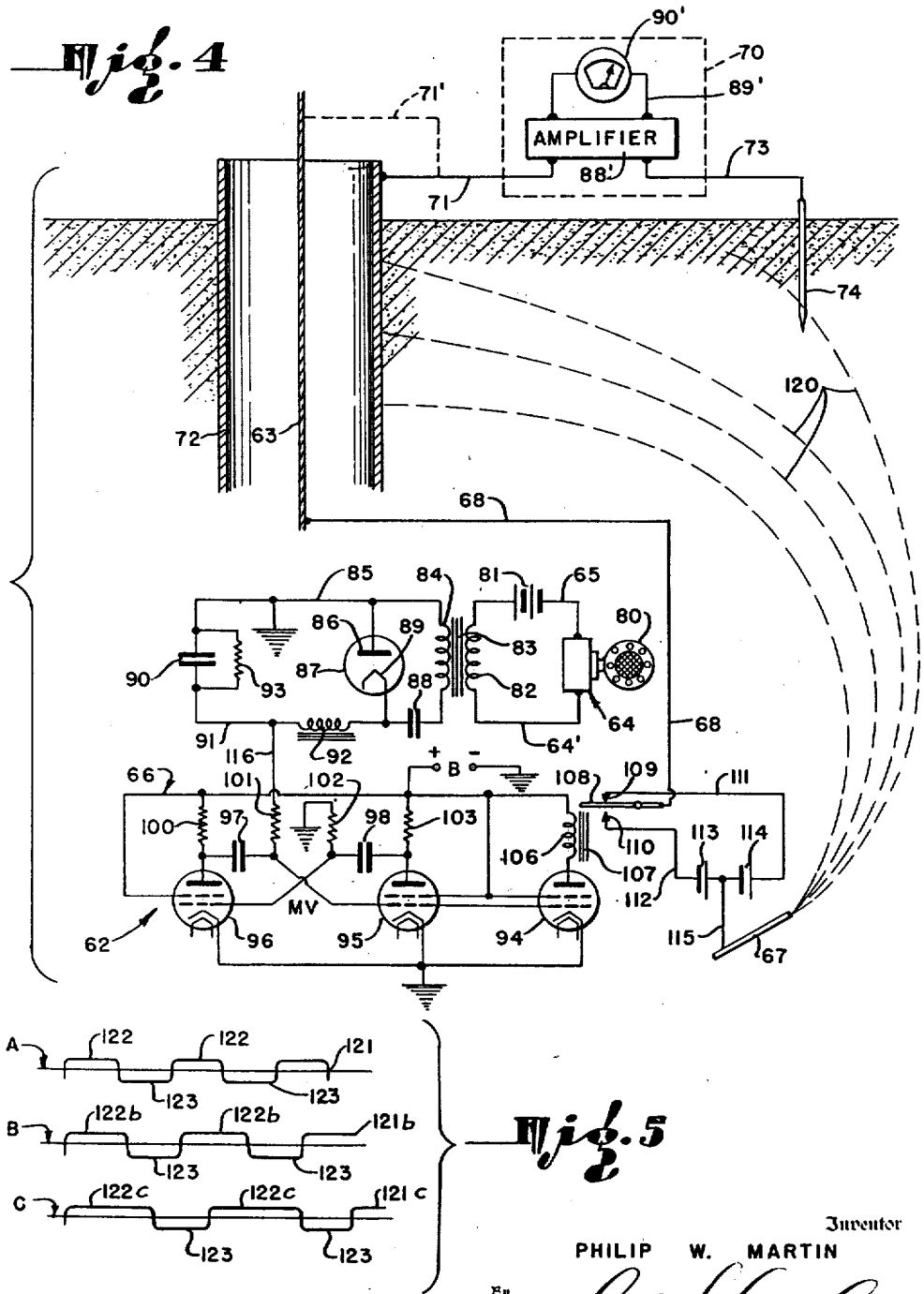

Patented Feb. 17, 1948

2,436,047

UNITED STATES PATENT OFFICE 2,436,047

TOOL INDICATOR

Philip W. Martin, Huntington Park, Calif.

Application June 15, 1945, Serial No. 599,591

6 Claims. (Cl. 177—311)

This invention relates to method and apparatus whereby knowledge or indications of conditions or activities in a deep well are brought to an observer at the top of the well, and relates in particular to a means and method whereby knowledge of relative movements of parts in a well are brought to the surface.

It is an object of the invention to provide a means and method whereby vibrations resulting from relative movements of parts or from other causes in a well are received by a sensitive element which is lowered into the well to the zone or level desired to be investigated, and sensible indication of these vibrations are transmitted to means located at the top of the well, whereby an observer may have knowledge thereof.

The invention is of extensive utility in conjunction with operations being conducted in a deep well, but for the purpose of simplifying this disclosure, I have limited the drawings and disclosure to only a few examples of the usefulness of the invention.

It is an object of the invention to provide a simple method and means whereby sounds produced by relative movement of parts or activities deep down in a well are received by a sensitive element lowered into the well for this purpose, and indications of such sounds are reproduced at the top of the well, thereby bringing to an observer at the top of the well knowledge of the reception of sounds by the sensitive element which are of informative value in conjunction with the operations being conducted within the well.

It is a further object of the invention to provide a means for bringing to an observer at the top of the well knowledge of the movement or cessation of the movement of an instrumentality in the well, which instrumentality may be any tool device or object which has been lowered into the well for the purpose of or entering the carrying on of the various operations utilized in the forming and completion of a well. The invention may be beneficially employed in conjunction with the use of tools which act upon the drill pipe, such, for example, as gun perforators, mechanical perforators, cutting off tools, etc. It is also of wide usefulness with devices by which observations are made within a well, such, for example, as well surveying devices, water locating instruments, coupling or tool joint locating devices, etc.

A further object of the invention is to provide a method and apparatus for indicating the actual travel of an instrumentality or operational means into a well in such a manner that any arrest of the movement thereof may be detected at the surface even before any slackening of tension in the supporting means—for example, a cable or string of pipe—is detected. As an example of this usefulness of the invention, with the appreciation that similar usefulness and conditions exist in the employment of the invention with other instrumentalities which are lowered into a well, I have described in the following specification an embodiment of the invention as employed with a well perforating gun whereby projectiles are shot through the well casing to provide openings communicating with an oil bearing formation from which production is desired. Many times the formation from which production is desired is very thin, and to locate the perforating gun opposite the desired formation involves many difficulties, especially where the perforating operation must be conducted at a level many thousands of feet below the surface. One of the procedures followed in lowering a gun to the desired position is to suspend the gun by means of a cable and to carefully measure the cable as it is fed into the well and making allowances for the computed stretch of the cable and the assumed flotation of the gun by the liquid substance or mixture in the well. By use of the present invention, it is possible for the operator to observe whether the downward movement of the gun is continuous or whether it may be stopped in the well due to an encountered obstruction, and also it is possible for the operator to note the passing of tool joints and couplings by the gun in its downward movement within the well. It is a general practice in setting casing in a well to make a log of the length of pipe as they are assembled and lowered into the well. My present invention makes it possible to check the lengths of pipe in the well against the log as an instrument is lowered in the well, thereby checking the distance through which the instrument is lowered against the distance indicated by the log, which log distance is a summation of the pipe lengths constituting the casing string in the well. After the device has been used in the foregoing manner to assist in the accurate locating of the gun in the well, it may be further employed to indicate to the operator the firing of the gun, for the reason that when the gun is fired, the movement thereof produced by the explosion of the firing charges produces vibration or sound which is indicated at the observation station at the top of the well. In one practice of the invention, the vibrations or sound waves picked up by the sensitive element which is lowered into the well with the gun are reproduced at the top of the well by transmission of electrical waves induced in an intercommunicating circuit by the vibrations received by the sensitive element.

A further object of the invention is to provide a method and apparatus whereby relative movement of parts in a well produces vibrations or sound and knowledge thereof is transmitted to an observer at the top of the well. A usefulness of this characteristic of the invention is in determining the point at which a pipe or casing is stuck in a well. The portion of the pipe above the point at which it is stuck is free to move; therefore, when a pull is exerted on the upper end of the stuck string, that portion thereof which is above the point at which it is stuck in the hole will stretch, resulting in a vertical movement of the portions of the casing above the point at which it is stuck. This movement of the casing, caused by stretching it, is utilized to produce relative movement of the casing to a substantially stationary sound sensitive element which picks up the sound resulting from this relative movement and transmits an indication thereof to an observation station at the top of the well. By progressively lowering the sound instrument in the casing and applying a stretching force to the casing, the operator may determine the point at which no stretch is produced by the application of an upward force to the upper end of the pipe or casing, thereby determining the level at which the formation is holding the pipe or casing against movement, and indicating the level at which it is stuck, so that the cutting operation, for purpose of recovery of the pipe or casing from the well, may be performed at a point just above and close to the level at which it is stuck. In this manner maximum recovery of casing from a well is possible. The point of sticking, as described in the foregoing, may be checked by progressively lowering the instrument within the casing and striking or vibrating the upper end of the casing, the vibrations thereby produced being transmitted down through the casing to the instrument. When the point of sticking is reached or passed, the vibrations will be damped by the tight or pressural engagement of the formation with the casing.

A further object of the invention is to provide a method and apparatus whereby the passing of a tool or instrument from one body of fluid into another body of fluid in the well may be determined.

Further objects and advantages of the invention will be brought out in the following part of the specification.

Referring to the drawings which are for illustrative purposes only,

Fig. 1 is a longitudinal sectional view through a portion of a well with my detecting apparatus associated therewith.

Fig. 2 is a detail sectional view of a portion of the detecting apparatus.

Fig. 3 is a diagram showing a type of detecting apparatus which does not require an electric cable but may be attached to the lower end of any means of suspension.

Fig. 4 is an electrical diagram showing the electrical equipment which may be employed in the practice of the invention as disclosed in Fig. 3.

Fig. 5 shows graphs indicating the different types of impulses produced in the operation of the form of the invention shown in Figs. 3 and 4.

As an example of one form of apparatus by which the invention may be practised, I have shown in Figs. 1 and 2 a detecting instrumentality embodying a sonic or vibration responsive pick up device adapted to transform mechanical vibrations transmitted from the wall of a casing 9 to a tool 10 being lowered into the casing 9, into variations in electric current flowing in a primary circuit, indicated generally at P, together with an amplifier and speaker 12 for transforming the stepped up current variations into sound. The mechanical vibrations are picked up from the casing 9 by a plurality of feelers 13 which engage the inner wall of the casing 9 and are vibrated as long as there is relative movement of the tool 10 and the casing 9. The vibrations thus induced are transmitted by the metal wall of the tool 10 and the metal wall of the casing 14 of a detector unit 15 to a microphone cartridge 16 which transforms the vibrations into variations in electric current in the circuit P, as previously stated. Consequently, as long as the tool 10 is moving, a recognizable sound will issue from the amplifier and speaker 12. As soon as the movement of the tool 10 is arrested, however, this sound will cease, thus notifying the operator at the surface of the well that the movement of the tool has stopped.

As the feelers 13 travel past the casing couplings 17, a different type of sound will be produced in the amplifier and speaker 12. Whereas the sound of the travel of the feelers against the inner surface of the drill pipe section is a sustained scratching noise, the sound produced in passing the couplings 17 is a sharp click, or a series of sharp sounds as the feelers pass over threads exposed within a coupling between adjacent pipe ends. Thus the couplings 17 may be counted as the tool 10 is lowered into the well, and the location of collars thus obtained may be utilized for locating the tool for a perforating operation. By noting the length of cable fed from the drum between successive collar, tool joint or coupling indications, the length of successive pieces of casing constituting the string in the well may be determined, and these lengths may be checked against the driller's log of casing set in the well.

When the tool 10 enters a body of liquid—such as, for example, mud present in the lower part of a drill hole—the contact of the feelers 13 with the casing 9 may be modified by the lubricating effect of the liquid, and the vibrations will be partially damped by the liquid. Consequently, the sound issuing from the amplifier and speaker 12 will be changed in character as the tool moves from one body of fluid into a body of fluid of different character, for example, from air into oil, water or mud, or from oil into water, vice versa.

Referring now to the details of construction shown in the drawing, the detector unit 15 includes the cylindrical casing 14 having at its upper end a female tool joint 18 adapted to be threaded upon a male joint 19 of a tool sub 20. At its other end, the casing 14 is provided with a male tool joint 21 adapted to be threaded into a female tool joint on the upper end of the gun or other tool 10.

The sub 20 has the conventional clamping mechanism 22 for clamping the sub upon the end of a cable 23, and a plug 24 for electrically connecting the core 25 of the cable 23 to a jack 26 which is sheathed in a bushing 27 of insulating material (such as Bakelite) and has a terminal rod 28 extending through an insulating bushing 29 and secured by a pair of threaded nuts 30.

The terminal rod 28 makes pressure contact against a contact pad 31 pressed into engagement with the terminal rod 28 by a coil spring 32. The coil spring 32 is compressed between the pad 31 and a second pressure pad 33, the rim of which engages a washer 34 of insulating material. The washer 34 in turn engages a peripheral flange on the microphone cartridge 16, which is of compressed granular carbon construction. Electrical contact between the pad 33 and the cartridge 16 is made through a small coil spring 35. The cartridge 16 is seated in a counterbore in the head 36 of a terminal rod 37. The rod 37 contacts, under the pressure of the spring 32, a conductor pin 38, which is received in a bushing 40 of insulating material, such as Bakelite. The conductor pin 38 has a terminal rod 41 extending through an insulating washer 42 and secured by threaded nuts 43. The end of the terminal rod 41 makes electrical contact with an ignition cartridge 44 mounted in a conventional nipple 45 which is threaded into the end of the male tool joint 21.

The ignition cartridge 44 communicates with the upper end of a fuse channel in the gun 10, for igniting the charges in the gun. It may be noted at this point that the gun ignition circuit forms a part of the same circuit as the detecting apparatus of my invention. Both the microphone cartridge 16 and the ignition cartridge 44 are arranged in series in one side of the circuit, including the cable core 25, the plug 24, the jack 26, the pressure pads 31 and 33 and the springs 32 and 35, cartridge 16, and the head 36 of the terminal member 37. From the head 36, the circuit has two paths to ground, one being through the ignition cartridge 44 which is grounded to the casing 14 through the nipple 45, and the other being through a resistance coil 46, one end of which is connected to the terminal head 36 and the other end of which is connected to a metal washer 47 threaded into the lower end of a sleeve 48 having metal to metal contact with the wall of the casing 14. The resistor 46 provides an alternate current flow path after the path through the cartridge 44 has been broken by the ignition operation. At the same time the resistor 46 offers such a high resistance to the flow of the ignition current that it does not interfere with the operation of the ignition circuit.

The sleeve 48 is lined with an insulator liner 49 within which the pad 31, the spring 32, the pad 33, the terminal head 36 and the resistance coil 46 are received.

The circuit P includes a conductor 51 forming a continuation of the core 25 of the cable 23, a double throw switch 52 including a switch arm 53 and a pair of switch contacts 54 and 55, a primary coil 56 of a transformer 57, a conductor 58, a resistor 59, and a conductor 62 connecting the other side of the battery 60 to ground through the sheath of the cable 23. A condenser 63, connected across the battery 60, between the conductors 58 and 62, cooperates with the resistor 59 to constitute a filter which functions to eliminate any alternating current component that may tend to develop in the direct current supplied in the primary circuit by the battery 60, although the use of a filter is not entirely essential to the invention. The primary function of the resistor 59 is to limit the current which can flow in the circuit P from the battery 60, so that such battery current will not operate the ignition cartridge 44.

It is possible to eliminate the battery 60 and utilize, instead of the carbon granule cartridge 16, a magnetic pick up or microphone generating its own voltage.

The secondary circuit, indicated generally at 63, includes the secondary 64 of the transformer 57 and suitable conventional amplifying, etc., apparatus embodied in the amplifier and speaker 12.

For operating the ignition cartridge 44, a source of high voltage 65 is employed, and is adapted to be connected into the circuit P by throwing the arm of the switch 53 over to the contact 55, the latter being connected to the source of high voltage 65 by a conductor 66. The feelers 13 may be located in either the tool 10, as shown, or in the casing 14, or in the casing of the tool sub 20. In any case, vibrations are transmitted mechanically through casing walls to the sleeve 48 and then through the liner 49 to the microphone 16. Vibrations may be also transmitted through the terminal rod 37 and the head 36 to the microphone 16.

The feelers 13, although they greatly improve the operation of the apparatus, are not entirely essential, it being possible to utilize vibrations picked up by direct contact between the walls of the tool 10, the detector casing 15, and the sub 20, and the drill pipe in order to operate the microphone 16.

In the operation of my detecting apparatus a sustained direct current of relatively low magnitude (due to the presence of the resistor 59) is maintained in the primary circuit P. This current has a moderate potential which may range from one to thirty volts for a conventional carbon grain microphone. I find that good results are obtained by employing a potential of approximately six volts. Movement of the tool 10 in the well causes the resistance of the carbon grain cartridge 16 to be varied, thus varying the magnitude of the direct current flowing in the circuit P. These current fluctuations are transmitted through the transformer 57 to the amplifying and speaking unit 12, thus producing an audible indication of the movements of the tool in the well.

Instead of audible indications of the tool movements, it would be possible to provide a visual indication by employing, instead of the amplifying speaking unit 12, a vibration level meter or a strip chart recording meter. It is possible, and in some cases desirable, to employ both audible and visual indicating instruments, and accordingly, and for the purpose of illustrating the use of a visual meter, I have indicated such a meter in Fig. 1 at 61.

In Fig. 3 I have diagrammatically shown apparatus whereby my invention may be practised without the use of a cable having an insulated electrical conductor extending therethrough. In this form of the invention a sound sensitive instrument 62 is lowerable into a well by any desired suspension means, for example—a string of tubing or the ordinary wire line or cable 63 shown. The instrument 62 includes a vibration or sound responsive circuit closing relay 64 which picks up the vibrations or sounds and transmits an operating or controlling current through circuit conductors 64' and 65 to a pulsating relay or generator 66 having output connections 67 and 68, contacting the casing or the formation at spaced points. The pulsations are preferably in the range of five to ten per second; therefore, the electrical waves transmitted to the casing and/or formation by the pulsating relay or generator 66 are of such character that they may be picked up at the surface of the ground by a receiving instrument 70 which I have shown connected by a conductor 71 to the upper end of the well casing 72 and by a conductor 73 with a metal stake 74 which is driven into the ground at a point spaced from the casing 72.

As shown in the electrical diagram, Fig. 4, the relay 64 includes a microphone 80 connected in series with a battery 81 and the primary winding 82 of an inductance coupling or transformer 83. One terminal of the secondary winding 84 of the transformer 83 is connected through a conductor 85 with the plate 86 of a rectifier tube 87 shown as a diode. The opposite terminal of the winding 84 is connected through a condenser 88 with the cathode 89 of the diode 87. A condenser 90 is connected to the plate 86 through the conductor 85 and is connected to the cathode 89 through a conductor 91 and a choke 92, there being a leak 93 bridged across the condenser 90.

The low frequency generator 66 includes an amplifier tetrode 94 which is controlled by cross connected tetrodes 95 and 96 arranged with condensers 97 and 98 and resistances 100, 101, 102 and 103 so as to form a multi-vibrator controlling the grids of the tetrode 94 and therefore controlling the pulsations of electrical current through the winding 106 of a relay 107 having a movable switch contact 108 arranged to alternately engage contacts 109 and 110 respectively connected through conductors 111 and 112 with batteries 113 and 114, the opposite poles of which batteries are connected through a conductor 115 with the contact 67 adapted to engage the well casing adjacent the device 62, Fig. 3. The ground connection 68 of the device 62 is connected to the movable switch contact 108. This ground connection 68 makes connection with the casing at a point spaced from the contact 67. A simple manner of accomplishing this is to connect the ground connection to the wire line or cable 63 which, at some point above the device 62, will engage the casing 72 owing to the fact that casings set in wells are not straight and cables which are under tension endeavor to straighten and therefore rub against the inner surface of the casing. If desired, the casing connection 71 of the receiving instrument 70 may be supplemented by a connection 71' carried directly to the cable 63.

The receiving instrument 70 includes a high gain amplifier 88', the output circuit 89' of which is connected in series with an electro-responsive indicating means such as a sensitive meter 99'. When an electrical impulse passes from the casing 72, through the conductor 71, the amplifier 88' and the conductor 73 to the ground stake 74, an amplified flow of current through the meter 90' will give an indication thereof.

When the device 62 is stationary in the well, the multi-vibrator MV will actuate the relay 107 in a manner or timed relation which is characteristic of the multi-vibrator. First, the contact 108 will engage the contact 109 so that the battery 114 will be connected in series with the contact 67 and the ground connection 68. This will result in the passage of an electro-potential wave front out through the formation, as indicated by lines 120. When this potential wave front reaches the stake 74, there will be a current flow through the amplifier 88' and the indicator or needle of the meter 90' will swing in one direction. When the movable contact 108 is drawn into engagement with the contact 110, the battery 113 will be placed in series with the contact 67 and the ground connection 68, thereby passing into the formation a wave front, such as indicated by lines 120, of opposite potential, the result being that when this wave front of opposite potential reaches the ground stake 74, the amplifier will be energized and the indicator of the meter will be swung in opposite direction. In the graph A of Fig. 5, I show the curve 121 of impulses 122 and 123 which are transmitted from the device 62 and indicated by the meter 90' when the device 62 is standing stationary in the well. This curve 121 indicates that the apparatus is operating and that the device is stationary. When the device 62 is moved so as to cause the feelers 13 thereof to traverse the inner surface of the casing 72 between joints or couplings, a low intensity sound will be picked up by the microphone 80, causing a small flow of electric current through the primary winding 82 of the transformer 83. The current flow induced in the secondary winding of the transformer 83 will be rectified by the diode 87 and a charge will be built up on the plates of the condenser 90. The conductor 91 is connected through a conductor 116 with the resistance 101 of the multi-vibrator MV, thereby placing a bias on one of the tetrodes of the multi-vibrator to change the relation of the impulses delivered to the relay 107, whereby the movable contact 108 will remain in engagement with the contact 109 for a period of time greater than the contact 108 is held in engagement with the contact 110. Accordingly, the impulses received by the amplifier 88 of one polarity will be longer than the impulses received by the amplifier 88 of opposite polarity, and a graph such as curve 121b will be produced having impulses 123 of the same length or time-duration as before, but the impulses 122b will be of greater duration. When the feelers 13 of the device 62 pass over a joint between adjacent ends of pipes forming the casing 72, sound of heavy amplitude will be picked up by the microphone 80 and a stronger charge will be built up on the plates of the condenser 90, the result being that a stronger bias will be applied through the conductor 116 to one of the tubes of the multi-vibrator MV, further increasing the time the movable contact 108 remains in engagement with the contact 109. The graph C of Fig. 5 shows the curve 121c of the impulses indicated by the meter 90' at this time. The impulses 122 of the graph A will be materially increased in duration, so as to produce long impulses 122c, graph C, with impulses 123 of unchanged duration. I have found that if the frequency of the electrical pulsations emitted by the low frequency generator 66 are of a value not materially greater than, and preferably less than, ten complete cycles per second, the suppressing or condenser effect of the formations will be overcome, the result being that the implement 62 may be employed in wells having a depth exceeding two thousand feet.

In my Patent No. 2,370,909, granted March 6, 1945, for Gun firing means, I have shown that low frequency electrical waves or pulsations will travel through long distances below the surface of the earth, owing to the fact that the subterranean formations will not greatly damp these waves or pulsating potentials whereas waves or pulsations of high frequency will be damped and lost. The receiver 70 may include a thermionic amplifier, but if reasonably strong waves are transmitted from the device 62, one of the sensitive electrical meters now obtainable on the market may be employed as the receiver 70, and the sensible indication of the reception of vibration or sound by the instrument 62 will consist of visible movement of the needle of such meter.

I claim as my invention:

1. Apparatus for detecting the relative movement of a suspended device in a deep well, comprising, in combination with said device and means on which it is suspended: a scraping member arranged in lateral extension from the exterior of said device so that it will continuously scrape along the wall of the well and as the result thereof to transmit vibrations to the wall of said device; a vibration responsive element, contained within said device and adapted, in response to vibrations transmitted thereto through the wall of said device as a result of the scraping of said scraping member against the wall of the well, to modulate electric currents passing therethrough, and an electric circuit including said vibration responsive element, said suspending means and an electroresponsive device at the surface of the well, adapted to utilize said current, thus modulated, to produce a characteristic indication at the surface of the well of the movement of said cable suspended device in the well.

2. In combination with a well casing perforating tool and means for suspending said tool in a well, an ignition cap for setting off an explosion in said perforating tool, a vibration responsive element in vibration receiving association with said device and adapted, in response to vibrations transmitted thereto as the result of the scraping of said device against the wall of the well, to modulate an electric current flowing therethrough, an electric circuit including said responsive element, said suspending means, said ignition cap, and an electroresponsive indicator at the surface of the well adapted, in response to current thus modulated, to give a recognizable indication of movement of said suspended device in the well, a source of low voltage for operating said indicator device, a source of high voltage for operating said ignition cap, a resistor in parallel with said ignition cap and forming a secondary path of current flow for said vibration responsive device when said ignition cap has been burned out, and a switch for selectively connecting either said source of low voltage or said source of high voltage into said circuit so as to operate respectively said vibration responsive element and said ignition cap.

3. Apparatus for detecting movement in a deep well of a device suspended therein, comprising, in combination with said device and means for suspending the same: a scraping member arranged in lateral extension from the exterior of said device so that it will continuously scrape along the wall of the well and as the result thereof to transmit vibrations to the wall of said device; a vibration responsive element in vibration receiving association with said device and adapted, in response to vibration transmitted thereto as the result of the scraping of said scraping member against the wall of the well, to modulate an electric current flowing therethrough, an electroresponsive device at the surface of the well, a circuit including said vibration responsive element, said suspending means and said electroresponsive device, said circuit also including a source of electrical energy and a vibrator for converting energy from said source into a pulsating current, said electroresponsive device being adapted, in response to said pulsating current, modulated by said vibration responsive element, to produce a characteristic indication of the movement of said device in the well.

4. In a device for operation in a pipe string in a well, the combination of: a body; suspension means for lowering said body into the well; means extending laterally from said body and arranged to scrape along the surface of the pipe string and thereby produce vibrations continuously as the body is moved along the pipe string; vibration responsive means carried by said body for producing variations in electrical energy; means for transmitting said electrical energy to the top of the well; and indicating means at the top of the well to receive said energy for bringing the operator continuous indications conforming to said vibrations, as the movement of the body along the pipe string is continued.

5. In a device for operation in a pipe string in a well, the combination of: a body; suspension means for lowering said body into the well; means extending laterally from said body and arranged to scrape along the surface of the pipe string and thereby produce vibrations continuously as the body is moved along the pipe string; vibration responsive means carried by said body for producing variations in electrical energy; means for transmitting said electrical energy to the top of the well; and indicating means at the top of the well to receive said energy, said indicating means having a visual indicator and sound producing means for bringing the operator continuous indications conforming to said vibrations as the movement of the body along the pipe string is continued.

6. In a device for operation in a pipe string in a well, the combination of: a body; suspension means for lowering said body into the well; means extending laterally from said body and arranged to scrape along the surface of the pipe string and thereby produce vibrations continuously as the body is moved along the pipe string; vibration responsive means carried by said body for producing variations in electrical energy; means for transmitting said electrical energy to the top of the well; and indicating means at the top of the well to receive said energy, said indicating means having sound producing means for bringing the operator continuous indications conforming to said vibrations as the movement of the body along the pipe string is continued.

PHILIP W. MARTIN.

REFERENCES CITED

The following references are of record in the file of this patent:

UNITED STATES PATENTS

| Number | Name | Date |
|---|---|---|
| 478,791 | Gardner | July 12, 1892 |
| 2,037,938 | Spencer | Apr. 21, 1936 |
| 2,201,311 | Hallibruton | May 21, 1940 |
| 2,303,360 | Irwin | Dec. 1, 1942 |
| 2,338,872 | Robidoux | Jan. 11, 1944 |